(12) United States Patent
Craven et al.

(10) Patent No.: US 9,845,133 B2
(45) Date of Patent: Dec. 19, 2017

(54) ELECTRIC BIKE MOTOR USING SENSED AIR SPEED

(71) Applicant: Ford Global Technologies, LLC, Dearborn, MI (US)

(72) Inventors: Richard Craven, Chelmsford (GB); Thomas Robert George Thompson, Brentwood (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/688,730

(22) Filed: Apr. 16, 2015

(65) Prior Publication Data

US 2016/0304157 A1 Oct. 20, 2016

(51) Int. Cl.
*B62M 6/50* (2010.01)
*B60L 11/18* (2006.01)
*B62M 6/90* (2010.01)

(52) U.S. Cl.
CPC ............ *B62M 6/50* (2013.01); *B60L 11/1809* (2013.01); *B62M 6/90* (2013.01)

(58) Field of Classification Search
CPC ......... B62M 6/50; B62M 6/90; B60L 11/1809
See application file for complete search history.

(56) References Cited

U.S. PATENT DOCUMENTS 6,957,129 B2 10/2005 Hatanaka et al.
7,411,366 B2 * 8/2008 Kang .................. B60L 11/1801
180/446

2009/0078485 A1 * 3/2009 Gutsch .................. A01D 34/67
180/218

(Continued)

FOREIGN PATENT DOCUMENTS

CN 1765692 A 5/2006
CN 104648594 A 5/2015

(Continued)

OTHER PUBLICATIONS

NYCE Wheels, last accessed Nov. 14, 2014, "BionX Intelligent Electric Bike System Users Guide" http://www.nycewheels.com/bionx-owners-manual.html. (4 pages).

(Continued)

*Primary Examiner* — Tuan C. To
(74) *Attorney, Agent, or Firm* — Frank A. MacKenzie; Brooks Kushman P.C.

(57) ABSTRACT

An electric bike is described and includes an air speed sensor to sense air speed at the bike, an electric motor to impart motive force to the bike, and a controller operatively connected to the motor, the controller to control the electric motor using the air speed sensed by the air speed sensor. The controller includes a set electric-motor parameter for the output power of the motor. The electric-motor parameter can be bike speed. The controller can also use ground inclination to determine the power to be output by the motor to assist in powering the bike. The controller can use ground inclination to determine the power to be output by the motor to charge a battery in the bike. The controller can set the power of motor assist to be greater in a greater headwind than in a lighter headwind. The controller uses rider weight and rider height as parameters for controlling the motor.

14 Claims, 4 Drawing Sheets

(56) References Cited

U.S. PATENT DOCUMENTS

| | | | |
|---|---|---|---|
| 2011/0160945 A1* | 6/2011 | Gale | B60L 3/0023 701/22 |
| 2012/0217075 A1* | 8/2012 | Nomura | B60K 6/383 180/65.21 |
| 2012/0239290 A1* | 9/2012 | Fujita | G01C 21/32 701/430 |
| 2012/0245809 A1* | 9/2012 | Ichida | B62M 25/08 701/51 |
| 2012/0261978 A1* | 10/2012 | Lu | B62M 6/45 301/6.5 |
| 2013/0059698 A1* | 3/2013 | Barton | A63B 71/0622 482/63 |
| 2013/0138302 A1* | 5/2013 | Hara | B62J 1/08 701/49 |
| 2013/0179016 A1* | 7/2013 | Gale | B60L 11/007 701/22 |
| 2013/0225360 A1* | 8/2013 | Hirn | B62M 6/75 476/11 |
| 2013/0311020 A1* | 11/2013 | Searles | B62M 6/50 701/22 |
| 2014/0236407 A1 | 8/2014 | Gros et al. | |
| 2015/0032340 A1* | 1/2015 | Lee | F16H 61/0204 701/52 |
| 2015/0175236 A1* | 6/2015 | Walthert | B62K 25/04 280/5.515 |
| 2015/0251725 A1* | 9/2015 | Rockwood | F16H 9/24 474/56 |
| 2016/0116356 A1* | 4/2016 | Goldstein | B62J 99/00 73/1.15 |
| 2016/0121963 A1* | 5/2016 | Tanaka | B60L 7/10 701/22 |
| 2016/0176473 A1* | 6/2016 | Faille | B62M 6/55 74/661 |
| 2016/0272277 A1* | 9/2016 | Hayslett | B62M 6/50 |
| 2016/0318581 A1* | 11/2016 | Kim | B60L 15/20 |
| 2017/0073040 A1* | 3/2017 | Djakovic | B62M 6/45 |

FOREIGN PATENT DOCUMENTS

| | | | |
|---|---|---|---|
| DE | 102014006952 A1 | 11/2015 | |
| EP | 0798204 B1 | 4/2000 | |
| EP | 1295785 A1 | 3/2003 | |
| EP | 2377713 A1 | 10/2011 | |
| FR | 2994936 A1 * | 3/2014 | B62M 6/45 |
| JP | 2004001735 A | 1/2004 | |
| JP | 2008044565 A | 2/2008 | |
| KR | 100913501 A | 8/2009 | |
| KR | EP 2829466 A1 * | 1/2015 | B62M 6/45 |

OTHER PUBLICATIONS

Great Britain Search Report dated Oct. 19, 2016 for Great Britain Application No. 1606646.6, 5 pgs.

* cited by examiner

ELECTRIC BIKE MOTOR USING SENSED AIR SPEED

TECHNICAL FIELD

The present disclosure relates to a bike with an electric motor, and more specifically, to a bike using air speed in control structure(s) and methodology.

BACKGROUND

Electric bicycles use an electric motor to reduce a force required for the rider's pedaling. The electric motor transmits power to an electric drive system connected to the bicycle's human power drive system.

SUMMARY

An electric bike is described that uses various sensor inputs to control the amount of electric motor assist to the powering the bike. An example of a sensor is an air speed sensor to sense air speed at the bike. A controller is operatively connected to the motor and controls the electric motor using a sensor input, e.g., the air speed sensed by the air speed sensor.

In an example, the controller has a set, electric-motor parameter for the output power of the motor. In an example, the electric-motor parameter is bike speed.

In an example, the controller uses ground inclination to determine the power to be output by the motor to assist in powering the bike. In an example, the controller uses bikeway, e.g., ground inclination, to determine the power to be output by the motor to charge a battery in the bike. In an example, the controller sets the power of motor assist to be greater in a greater headwind than in a lesser headwind.

In an example, the controller uses rider weight and rider height as parameters for controlling the motor.

Electric bicycle methods are also described. A method can include setting a rider effort level, sensing relative air speed at the bicycle, and assisting the rider effort level with an electric motor based on the sensed air speed. In an example, assisting the rider effort level includes maintaining an essentially constant rider effort level based on the air speed. In an example, assisting the rider effort level includes sensing the inclination of a bikeway and adjusting the electric motor assist based on the inclination. In an example, assisting the rider effort level includes increasing the electric motor assist by at least twice when the bikeway is at an incline relative to a flat bikeway. In an example, assisting the rider effort level includes using the electric motor to charge a battery with the bikeway being a decline relative to a flat bikeway.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A bicycle, also referred to as a bike or a cycle, is a vehicle which provides for a human-powered, generally pedal-driven, means to propel the vehicle. Bicycles are generally single-track vehicles, having two wheels attached to a frame, one behind the other. Bicycles generally have a power driven rear wheel and a free spinning turnable front wheel. However, a bicycle with a driven front wheel is within the scope of the present disclosure. The term bicycle generally refers to a vehicle having two (bi) circular arrangements (cycle), however, as used in this patent application the term bicycle may also be considered to extend to tricycle and quadcycle vehicles having two side-by-side power driven wheels and/or two side-by-side free spinning wheels or other arrangements of free and driven wheels. The term bicycle may also include vehicles that have additional wheels used to provide stability, such as stabilizer wheels, out-rigger wheels, or training wheels.

A bicycle may also include supplemental forms of propulsion, such as a motor (sometimes referred to as an electric bicycle or ebike) or engine. However a motor or engine driven vehicle similar to that of a bicycle, but without human-powered propulsion means, would be considered a motorcycle and not a bicycle. The term bicycle, as used in this patent application, does not include motorcycles or the like.

Example embodiments of the present disclosure include electrically-assist bicycles with an airspeed sensor that determines the air speed at the bike. The air speed can be used in a control algorithm(s) to provide electrical power to assist in powering the bike.

Figure 1:
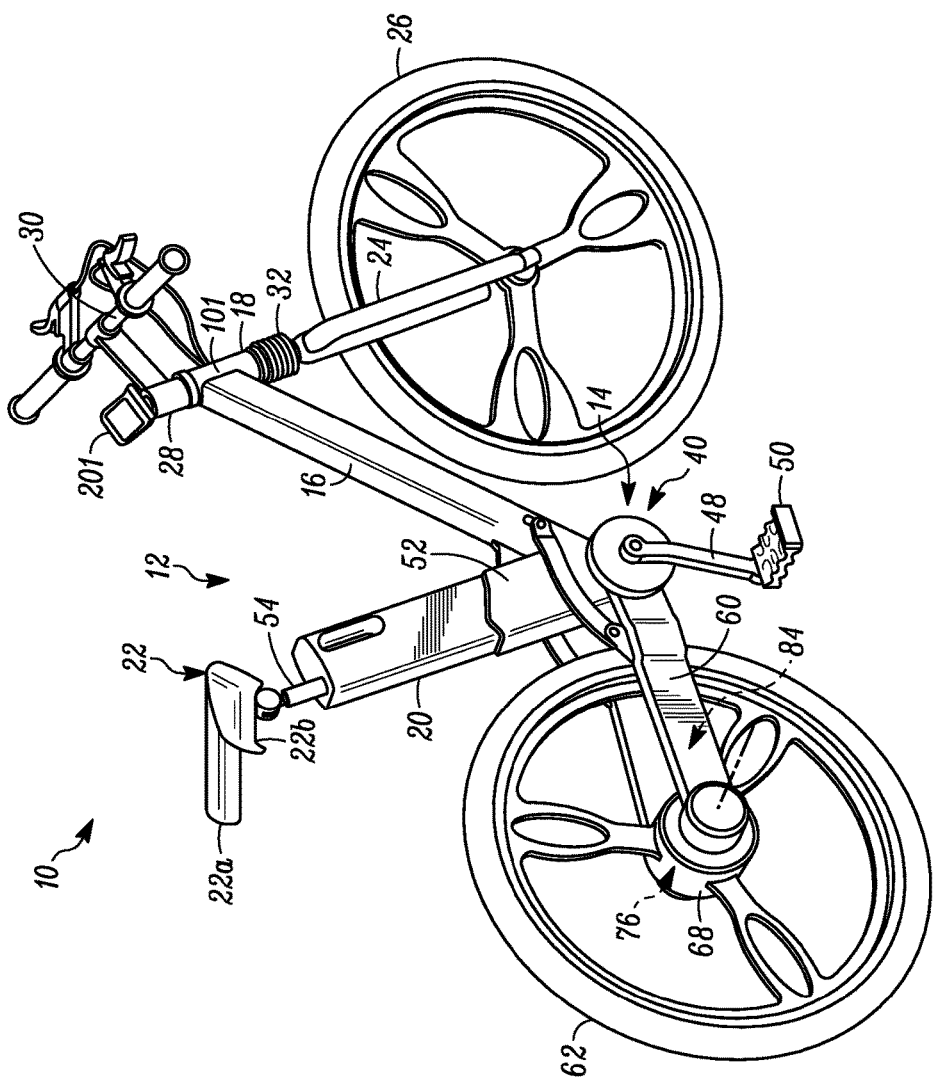
FIG. 1 is a view of an electric bicycle according to an embodiment.

FIG. 1 shows a bicycle 10 having a frame 12. The frame 12 defines a hanger bracket 14, a down-tube 16, and a head-tube 18. Frame 12 has the hanger bracket 14 connected to the down-tube 16. Frame 12 has the head-tube 18 connected to the down-tube 16. Frame 12 does not have a top-tube. Frame 12 may also have a seat stay 20 for supporting a seat 22. The seat stay 20 may be connected to the down-tube 16 proximate the hanger bracket 14, the seat stay 20 may be connected solely to the hanger bracket 14, or the seat stay may be connected to both the hanger bracket 14 and the down-tube 16. In an example, the seat stay 20 may store a battery therein.

A steerable front fork 24 may be used to support a front wheel 26. The term wheel, as used in this patent application, may include a tire, a rim, and a support structure, such as spokes or the like, to support the tire and rim. A stem 28 may connect the front fork 24 to a set of handlebars 30. The stem 28 may be partially disposed within the head-tube 18 and may have bearings sandwiched between the stem 28 and inner surface of the head-tube 18 to allow the handlebars 30 to turn the front fork 24 and front wheel 26. A front shock-absorber 32, or front suspension system 32, may also be utilized to provide damped vibration between the handlebars 30 and the front wheel 26. The front shock-absorber 32 may be disposed in-line or between the front fork 24 and the stem 28.

The portable portion of the seat stay 20 (also referred to as a detachable assembly) may include a removable support, a seat assembly 22 (also referred to as a seat 22 herein), and a post. The post may be retractable into the removable support as described in more detail herein. Specifically, the post may be unlocked via a post-lock. Moreover, the seat 22 may include two seat portions, or flaps 22a, 22b which may be foldable at a hinged joint. Although not shown in FIG. 1, the seat assembly 22 may include a seat-lock configured to lock and unlock the two seat portions 22a, 22b (i.e., permit for a folded and unfolded state of the seat). The seat-lock may maintain the seat in an unfolded state and allow the seat 22 to maintain a rider's weight and prevent folding at the joint. The seat assembly 22 may include a post-hinge for adjusting the angular offset of the seat 22 (e.g., the vertical position with respect to the post 54). The removable housing may be configured to house certain power elements of the bicycle 10 such as batteries, gears, motor, cords, controller, and attachment mechanisms. Thus, after use, the owner/user may remove the portable portion and take the seat assembly 22 and the housing 52 containing expensive power components with him or her. Greater detail of an example detachable assembly is described in U.S. patent application Ser. No. 14/635,432, which is hereby incorporated by reference for any purpose.

Pedals 50 (only one of which is shown) may each be connected to an associated pedal arm 48 and may be configured to drive or propel the bicycle 10, e.g., through a crank. A user may push the pedals 50 to rotate a gear connected to a driveshaft 84 to drive the rear wheel 62 forward. Additionally or alternatively, power sources, such as batteries and an electric motor, may also propel the vehicle in addition to, or without user interaction at the pedals 50. Batteries may be maintained in the housing of the seat stay.

A rear stay 60 may connect a rear wheel 62 to the frame 12. The rear stay 60 is pivotally connected about the hanger bracket 14. The rear stay 60 may be pivotally connected to the frame 12 about a crank 40 and also may be connected to a wheel hub 68 that supports the rear wheel 62. A gearbox/electric motor assembly 76 may be disposed in the rear hub 68. The gearbox/electric motor assembly 76 may be configured to provide a number of speeds and/or motive power for the bicycle 10. The gearbox/electric motor assembly 76 may be configured to provide at least two speeds for the bicycle 10.

An airspeed sensor 101 is positioned on the bike, here shown on the head-tube 18. The airspeed sensor 101 can be positioned at other locations on the bike, e.g., the handlebars 30 or other parts of the frame. The airspeed sensor 101 can also be a component of an electric device mounted to the bike. An example of the electric device is a mobile phone or other portable electronic device. The airspeed sensor 101 can be a gauge or other instrument to display the airspeed at the bike 10. In an example, the airspeed sensor 101 can determine the relative airspeed or the true airspeed, e.g., in knots, miles per hour, or other distance per unit of time. The airspeed sensor 101 can be a differential pressure gauge with the pressure reading expressed in units of speed. The airspeed is derived from the difference between the ram air pressure from a pitot tube, or stagnation pressure, and the static pressure. The pitot tube is mounted facing forward. The static pressure is frequently detected at static ports on one or both sides of the bike. Both pressure sources can be combined in a single probe, a pitot-static tube.

Figure 2:
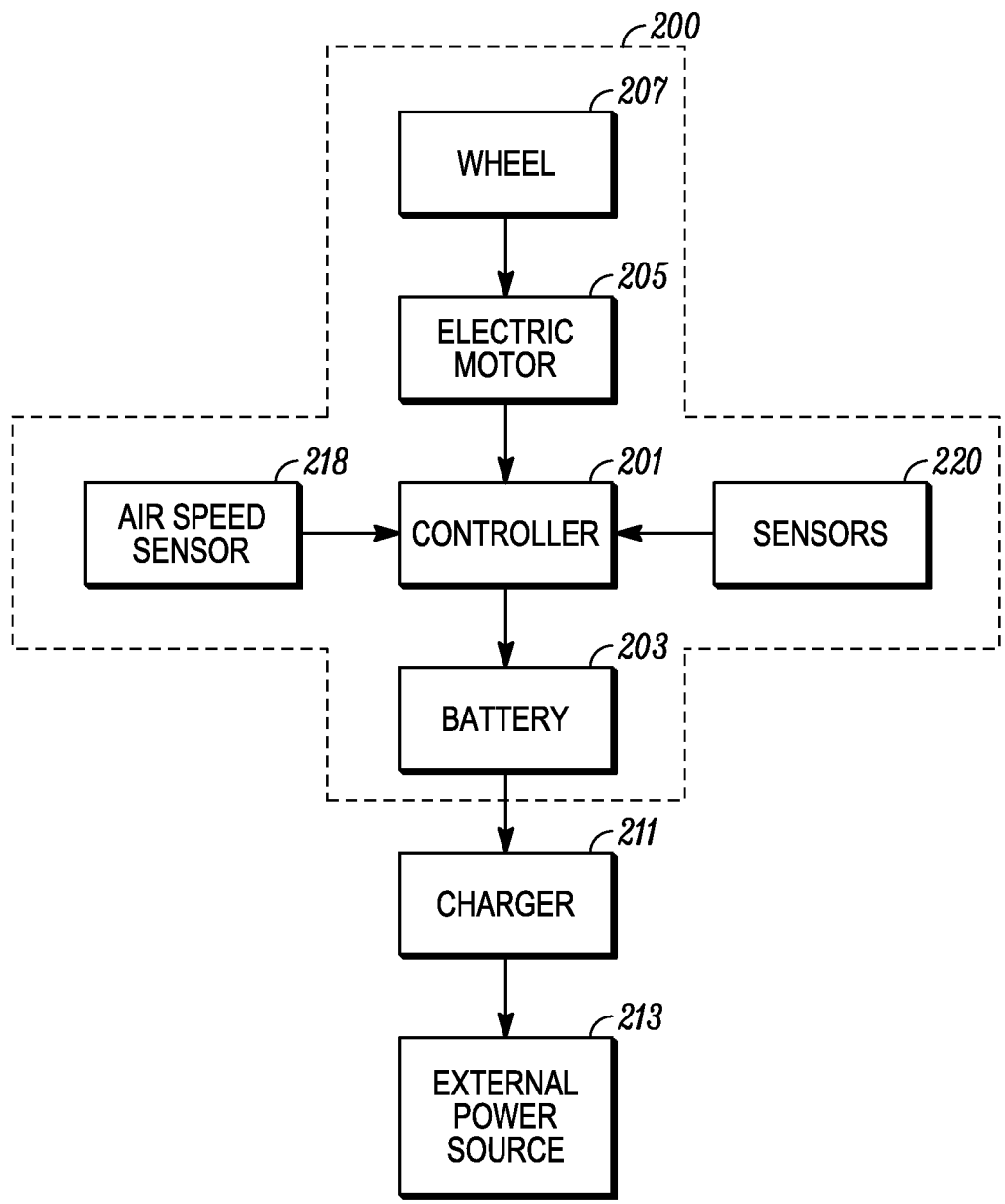
FIG. 2 is a schematic view of an electric bicycle according to an embodiment.

FIG. 2 shows an electric bike 200 that includes a controller 201 that is electrically connected to a battery 203 and controls electrical energy being supplied to the electric motor 205 that assists in driving at least one bike wheel 207. The battery 203 and the motor 205 can be mounted on or in a frame of a bicycle. The battery 203 can be charged by the wheel 207 driving the electric motor 205. The battery 203 can also be charged from a charger 211 that can be connected to a power source 213. The power source 213 can be external to the bike and can be the utility power, e.g., AC or other power mains. The charger 211 can convert the electrical signal from the power source 213 to a signal that can charge the battery 203.

The controller 201 is also connected to the air speed sensor 218 and to other sensors 220. The air speed sensor 218 provides air speed data to the controller 201, which can use the air speed to control the operation of the electric motor and power assist to the rider, who is riding the bike. Other sensors 220 can provide other information to the controller 201. Examples of sensors 220 can be inclination sensor (e.g., a tilt sensor), speed sensor, revolution per minute (or other rotary data) of the pedal crank or the wheels, torque at the motor or wheel, battery statistics, communication links between the controller and other external communication devices, charging state of the charger, etc.

Figure 3:
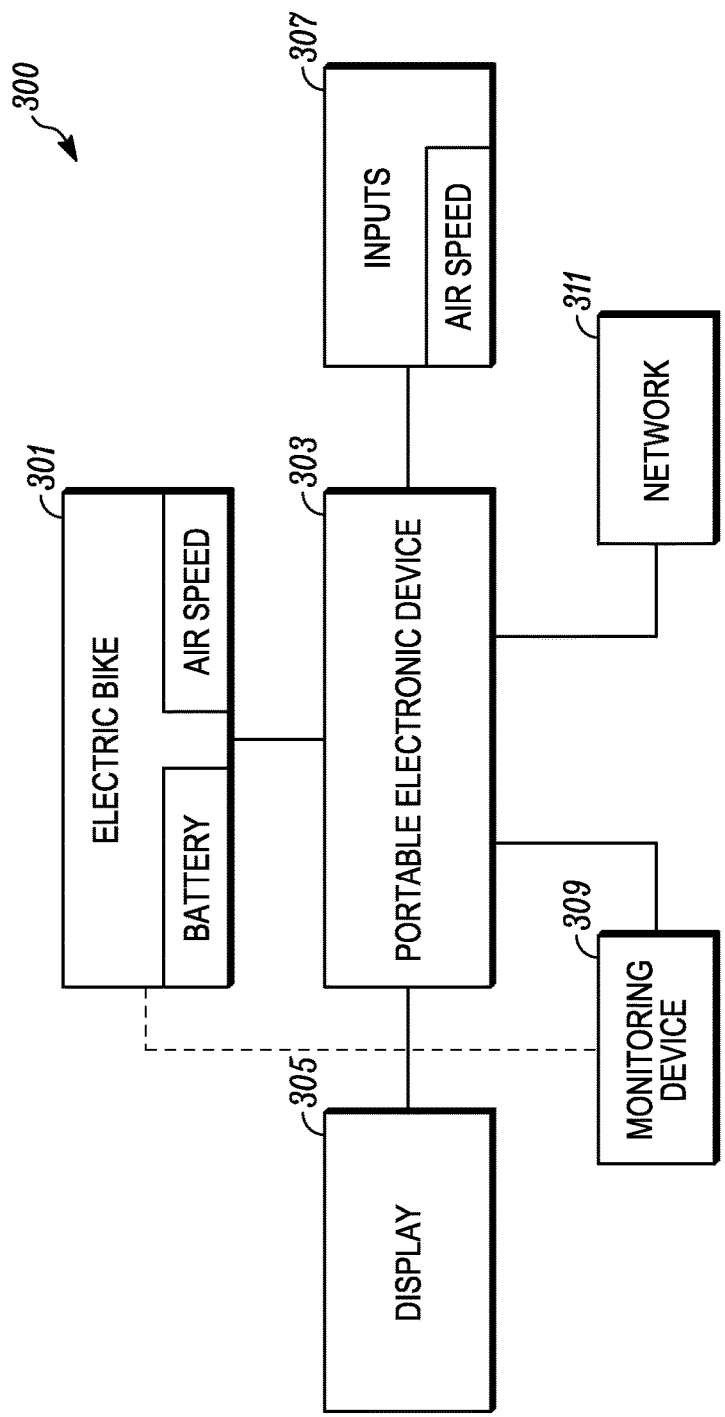
FIG. 3 is a schematic view of an electric bicycle according to an embodiment.

FIG. 3 shows an embodiment of the electric bike system 300 and some of its components, including the bike 301 with various electrical components, including a portable electronic device 303. The bike 301 includes the battery and an airspeed sensor. The electronic device 303 is electrically connected to the electric bicycle 301. The information can be exchanged between the bike 301 and the device 303 and can include operation data on the electric bicycle 301, control data for the electric bicycle 301, and a plurality of operational programs, e.g., exercise, commute, travel, trail, and the like. A plurality of operations of the electrical bicycle 301 are controlled by the electronic device 303 based on the operation data from the electric bicycle 301 and control data from the electronic device 303. In certain embodiment of this aspect, a plurality of operations of the electrical bicycle 301 are monitored by the electronic device 303 based on the operation data from the electric bicycle 301 so as to determine the state of the electric bicycle 301. A display 305 can be connected to the electronic device 303 to provide information to the attention of the bicycle rider, e.g., the power assist, the battery charge, time until the battery is depleted, the inclination of the bike and the air speed. Inputs, e.g., sensors or calculated data, 307 are provided to the device 303. In an example, the airspeed sensor is an input and not fixed to the bike. In another example, the airspeed sensor is fixed to the bike 301.

A monitoring device 309 is can be operably connected to the device 303 to monitor bodily condition of a bicycle rider on the bike 301. The monitoring device 309 can produce data, and communicates the monitored data with the device 303 either directly or through the electric bicycle 301. The bicycle rider can ride the electric bicycle 301 with the plurality of operational programs to achieve desired outcome. In an example, the monitoring device 309 can monitor heart rate, sweat, calories or other physiological data of the rider. The monitoring device 309 or the processing device 303 can store other data such as weight, riding time, and/or a target work by the rider.

The display 305 can display information to the rider. Examples of information include input and output to bike, status of the device 303, and status of the electric bicycle 301, including power, battery state, RPM, acceleration, air speed, inclination and speed. The bicycle rider can check the status of him/herself and the electric bicycle 301 via the display. The information shown on the display can be shown in real time.

A plurality of operations of the electrical bicycle 301 is controlled by the electric device 303 based on the monitored data from the monitoring device 309, the operation data from the electric bicycle 301 (e.g., air speed), and other the control data stored in the device 303. The plurality of operations of the electric bicycle 301 can include a power output level, a gear shift, RPM, speed, acceleration, electric power consumption, battery power state and the like.

The plurality of operations of the electrical bicycle 301 can be controlled to provide any target power consumption from the battery or a target power input by the bicycle rider. The work load to the bicycle rider can be maintained at a single target value, or can be controlled according to a predetermined schedule in time and location. This schedule can be stored in the electronic device 303.

The electronic device 303 may comprise a personal digital assistant, a portable phone, a smart phone, a portable computing device, a tablet, other electric circuits that can process inputs using rules and instructions. In an example, the display 305 may be integrated with the electronic device 303. The electronic device 303 and the electric bicycle 301 can communicate with each other through a wireless communication, e.g., a Bluetooth, a WIFI, cellular or other wireless communication. Electronic device 303 can communicate with the electric bicycle 301 through a wired connection, e.g., Ethernet, a USB, a Firewire, digital AV, Thunderbolt and the like.

The power of the electric bicycle 301 may be controlled by the electronic device (information processor) 303 so as to maintain a target value, e.g., speed, target heart rate, power consumption, battery life, or other.

The electronic device 303 can communicate to other devices on a network 311. The network 311 may include a global computer network, e.g., the Internet, a local area network, a personal computer and/or a server. Each of the plurality of operational programs may be downloaded in real time by the device 303 through the network 311. For example, the device 303 may connect to network through a wireless or wired connection, e.g., cellular, WiFi, and the like.

The device 303 may also include a navigational positioning system, e.g., global positioning system (GPS), Galileo system the GPS IIF system, Beidou, COMPASS, GLONASS, Indian Regional Navigational Satellite System (IRNSS), or QZSS, or other satellite-based positioning system. The target operational program may comprise information that uses data from the navigational system. The navigational positioning system can be additional sensor data used by the device 303.

The additional sensors 220 can include a tilt sensor that can measure the tilting in two axes of a reference plane in two axes. In an example, the reference plane is defined by the frame of the bicycle. The sensors 220 can include a full motion sensor which would use at least three axes and often use additional sensors. One way to measure tilt angle with reference to the earth's ground plane, is to use an accelerometer. These sensors can also measure pitch and roll of the bicycle. These sensors can be MEMS devices.

Figure 4:
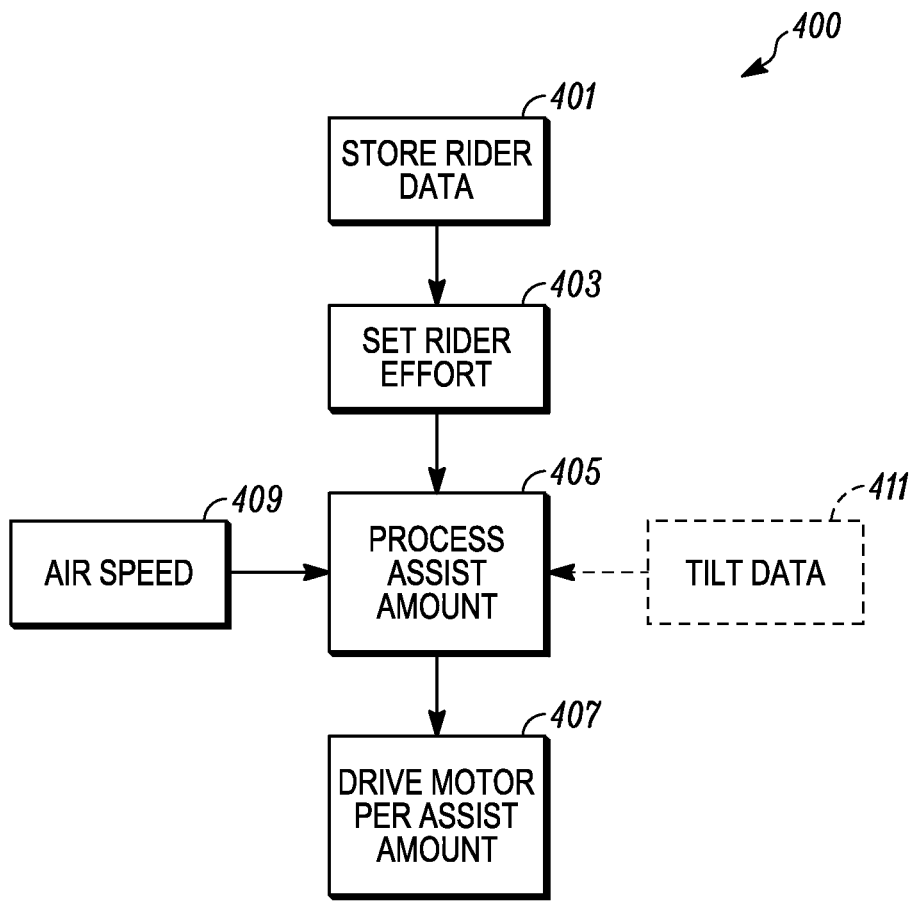
FIG. 4 is a flow chart of an electric bicycle method according to an embodiment.

FIG. 4 shows an operation process 400 for the electric bike. At 401, the rider data is stored, e.g., the device 201 or 303. Rider data can include the weight and height of the rider. At 403, the amount of effort that the rider will contribute to the motive power of the bike is set. In an example, the rider can set the amount of power that the motor will provide to move the bike. The amount of power can be set to a specific watt level or a level at which the battery power remaining after the trip will be at a set amount. For example, the battery power can be set to have half a full battery charge at the end of the ride or essentially zero when the bike arrives at a destination. The destination can be input by the rider or can be a previously stored, e.g., home, work, office, grocery store, bar, coffee shop or other frequently biked to destination.

At 405, the set rider effort and the rider data is used to send a control signal to the electric motor to power the motor with electrical energy from the battery. The step 405 can also receive the air speed data 409 and use the air speed in calculating the power to be supplied to the motor. At 407, the motor assists with the motive power to the bike using an assist amount as calculated.

At 411, optionally, tilt or inclination data can be provided to the step 405 and used to determine the motor assist amount.

Specific examples using the method 400 and the structures described herein will now be described. The rider's weight and height are stored in the system and can be used as inputs into a control algorithm. The rider's effort level can be set and stored in the system. The rider's effort can be fixed for this ride. The control algorithm then varies the amount of assist from the motor and battery to maintain a speed with a fixed user effort. The air speed sensor can provide air speed. The algorithm uses the air speed data to vary the amount of assist. For example, when a strong head wind is experienced by the bike, greater motor assist is provided. On a relatively flat surface, the rider effort is set at 100 watts. The motor assist can be twice that when there is no wind (e.g., 200 watts versus 100 watts). If the headwind stops or is reduced by half, the amount of motor assist is reduced by half or by one quarter.

The control algorithm can use a tilt sensor and wind speed sensor to use both the bike inclination and the air speed to determine the amount of motor assist. The bikeway e.g., road or path, elevation and the change in the bikeway elevation can be used by algorithm to determine the motor assist. Again, the rider input is set. This can be set relative to a no headwind and a flat bikeway scenario. When the bike is on an incline, which can be determined by sensors, the bike requires more power from the motor to maintain the same level of input from the rider to maintain a similar speed. Here, the algorithm maintains the rider effort and increases the power input from the motor as it measures the incline increase. In an example, the incline is 5% grade. The rider input is constant, e.g., 100 watts, and the motor input is at least two times that of the motor input on the flat bikeway, e.g., 200-250 watts. In an example, a bikeway incline will cause the motor assist to increase up to 2.5 times or up to 3 times the assist of the motor on a flat bikeway. However, the amount of the motor assist can be partially dependent on the weight of the rider.

When the bike is on a bikeway decline, the bike would normally freewheel with gravity providing the motive force. The bike may gain speed over time under the force of gravity. Here, the controller using the control algorithm can switch the motor to a regeneration mode. A regeneration mode allows the motor to produce electrical energy to charge the battery. Here the rider input can remain the same or be reduced by the amount of motive energy being provided by gravity on the bikeway decline. In another example, the rider is expected to provide the same energy input, e.g., 100 watts, as in the flat roadway or incline uses.

If the rider maintains the energy input, then the downhill energy is used to charge the battery.

In the case with a strong headwind, the air pressure sensor measures the wind speed relative to the bike speed. The controller or algorithm calculates the motor input required to maintain the rider effort even with the headwind while also maintaining a relatively constant speed. The headwind is sensed on all of a flat bikeway, an inclined bikeway and a declined bikeway. The air speed can be used in any of these use cases to determine the amount of the motor assist.

The above algorithm examples can use the weight and height of the rider to estimate the effect of the wind on the bike speed and the input needed by the motor. A taller rider may catch more wind and need more motor assist than a shorter rider. A larger rider may catch more wind and need more motor assist than a smaller rider due to a greater effect of the wind. A heavier rider may require more motor assist than a lighter rider.

The present description uses constant rider input or a fixed rider effort to describe power input into the bike to move the bike. However, fixed or constant power is not constant at every period of time. Constant or fixed as used herein to describe rider effort is within an envelope of effort, e.g., +/−2.0%, 5.0% or up to +/−10% (or any percent between 2% and 10%). The controller will not increase or decrease the amount of assist until the rider effort extends outside the range that defines a constant or fixed rider effort.

The controller and the control algorithm use electric-motor parameters that are used to control the electric motor. Examples of such electric-motor parameters are used in the present description but the disclosure is not limited to the specific examples. Examples of electric-motor parameter include output power of the motor, battery power remaining, bike speed, air speed, size of rider, inclination/declination of the bikeway, among others.

Airspeed as used herein can be the headwind relative to the speed of the bike. The faster a bike moves the greater the effective headwind. The headwind created by the bike movement can be subtracted from the measured headwind to arrive at a true headwind that is used in the controller or the control algorithm. In an example, the air speed sensor measures true airspeed by using various differential measurements.

The motor is controlled to provide at least four levels of assist. First, no assist by the motor. Second, the rider pedals to provide a constant power input and the motor provides a variable power assist. The variable power assist can be based on the air speed relative to the speed of the bike. A third assist, is a negative assist that provides a regeneration mode. The negative assist produces electrical energy to charge the battery. A fourth mode is negative assist with the rider pedalling, which can also charge the battery.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical/operational implementation that is desired. It is recognized that any circuit or other electrical device disclosed herein may include any number of microprocessors, programmable logic array(s), integrated circuits, memory devices (e.g., FLASH, random access memory (RAM), read only memory (ROM), electrically programmable read only memory (EPROM), electrically erasable programmable read only memory (EEPROM), or other suitable variants thereof) and instructions (e.g., software) which co-act with one another to perform operation(s) disclosed herein. In addition, any one or more of the electric devices may be configured to execute a computer-program that is embodied in a computer readable medium that is programmed to perform any number of the functions and features as disclosed. The computer readable medium may be non-transitory or in any form readable by a machine or electrical component.

The present disclosure provides controls to an electric bike that allows the rider to set the level of effort and maintain a set speed. The level of effort can be set so that the rider can arrive at the destination and not be sweaty or overly tired. In another example, the rider can set the level of assist so that the electrical energy in the battery is used to its maximum extent with some electric motor assist through the entire ride. In another example, the motor assist can be set to be greater on the way to a destination relative to the return home trip. These benefits provide an improved rider experience and may increase the adoption of electric bikes, which may benefit the environment and health of the rider.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric bike comprising:
   an air speed sensor to sense air speed;
   an electric motor to impart motive force to the bike; and
   a controller operatively connected to the motor, the controller to control the electric motor using the air speed sensed by the air speed sensor and to switch to a regeneration mode charging a battery from the electric motor when an inclination is negative and gravity assists powering the bike forward.

2. The bike of claim 1, wherein the controller has a set electric-motor parameter for output power of the motor.

3. The bike of claim 2, wherein the electric-motor parameter is bike speed.

4. The bike of claim 3, wherein the controller uses ground inclination to determine power to be output by the motor to assist in powering the bike.

5. The bike of claim 4, wherein the controller uses ground inclination to determine the power to be output by the motor to charge a battery in the bike.

6. The bike of claim 5, wherein the controller sets the power to be output by the motor to be greater in a greater headwind than in a lesser headwind.

7. The bike of claim 6, wherein the controller uses rider weight and rider height as parameters for controlling the motor.

8. The bike of claim 1, wherein the controller sets a constant rider power input and adjusts the power provided by the electric motor to maintain the constant rider power input.

9. The bike of claim 1, wherein the air speed sensor is mounted to a frame of the bike forward of a rider and wherein the battery is mounted to the frame.

10. The bike of claim 1, wherein the controller is a portable electronic device in electronic communication with the air speed sensor and electric motor.

11. The bike of claim 1, wherein the regeneration mode includes a bike freewheeling.

12. The bike of claim 1, wherein the air speed sensor is to supply air speed data sensor to supply an air speed to the controller and wherein the controller is further programmed to provide a selection of a no power assist mode, a variable power assist mode, and a negative assist mode.

13. An electric bicycle method comprising:
   setting a rider effort level;
   sensing relative air speed using an airspeed sensor at the bicycle while the bicycle is in motion forwardly; and
   assisting the rider effort level with an electric motor providing motive force to a wheel based on the relative air speed sensed by the airspeed sensor, wherein assisting includes:
      sensing inclination of a bikeway and adjusting electric motor assist based on the inclination and the relative air speed,
      increasing the electric motor assist by at least twice when the bikeway is at an incline relative to a flat bikeway, and
      using the electric motor to charge a battery with the bikeway being a decline relative to a flat bikeway.

14. The method of claim 13, wherein assisting the rider effort level includes maintaining an essentially constant rider effort level based on the air speed.

\* \* \* \* \*